(12) United States Patent
Henderson

(10) Patent No.: US 8,662,291 B2
(45) Date of Patent: Mar. 4, 2014

(54) TELESCOPIC BELT CONVEYOR

(75) Inventor: Martin Henderson, Merseyside (GB)

(73) Assignee: Sovex Limited, Prenton, Wirral (GB)

( * ) Notice: Subject to any disclaimer, the term of this patent is extended or adjusted under 35 U.S.C. 154(b) by 0 days.

(21) Appl. No.: 13/812,282

(22) PCT Filed: Sep. 5, 2011

(86) PCT No.: PCT/GB2011/001303
§ 371 (c)(1),
(2), (4) Date: Jan. 25, 2013

(87) PCT Pub. No.: WO2012/049445
PCT Pub. Date: Apr. 19, 2012

(65) Prior Publication Data
US 2013/0118866 A1  May 16, 2013

(30) Foreign Application Priority Data
Oct. 15, 2010  (GB) .................................. 1017496.9

(51) Int. Cl.
*B65G 15/26* (2006.01)
*B65G 67/02* (2006.01)

(52) U.S. Cl.
USPC ........................... 198/812; 198/588; 198/594

(58) Field of Classification Search
USPC .......................... 198/588, 594, 595, 598, 812
See application file for complete search history.

(56) References Cited

U.S. PATENT DOCUMENTS

| | | | |
|---|---|---|---|
| 3,651,963 A * | 3/1972 | McWilliams | 414/789.8 |
| 3,819,068 A | 6/1974 | Weir | |
| 3,866,768 A * | 2/1975 | Weir | 414/392 |
| 3,885,682 A | 5/1975 | McWilliams | |
| 3,931,897 A * | 1/1976 | Bacon et al. | 414/789.8 |
| 3,982,625 A * | 9/1976 | Wentz et al. | 198/572 |

(Continued)

FOREIGN PATENT DOCUMENTS

| | | |
|---|---|---|
| EP | 2 003 076 A2 | 12/2008 |
| GB | 2 136 753 A | 9/1984 |
| WO | WO 01/49595 A1 | 7/2001 |
| WO | WO 02/08098 A2 | 1/2002 |

OTHER PUBLICATIONS

International Search Report mailed Dec. 19, 2011 for International Application No. PCT/GB2011/001303.

(Continued)

*Primary Examiner* — Douglas Hess
(74) *Attorney, Agent, or Firm* — Fay Sharpe LLP

(57) ABSTRACT

A telescopic belt conveyor includes a base conveyor unit (4), an outer conveyor unit (10) and optionally one or more intermediate conveyor units (6, 8). The outer conveyor unit (10) and any intermediate conveyor units (6, 8) are mounted on the base conveyor unit and extendable telescopically therefrom in an extension direction. The outer conveyor unit (10) includes a pivotable conveyor section (12) that is mounted for pivoting movement about a substantially horizontal pivot axis. A conveyor belt (14) is supported by the base conveyor unit (4), the outer conveyor unit (10) and the intermediate conveyor units (6, 8), the conveyor belt providing a conveyor surface that extends continuously along an upper surface of the base conveyor unit (4), the outer conveyor unit (10) and the intermediate conveyor units (6, 8). The pivotable conveyor section (12) has a free end remote from the pivot axis whose height relative to a ground surface may be adjusted by pivoting movement of the pivotable conveyor section.

12 Claims, 6 Drawing Sheets

(56) References Cited

U.S. PATENT DOCUMENTS

| | | | | |
|---|---|---|---|---|
| 4,279,555 | A * | 7/1981 | Rydell | 414/793.8 |
| 4,281,955 | A * | 8/1981 | McWilliams | 414/398 |
| 4,425,069 | A * | 1/1984 | Saur et al. | 414/398 |
| 4,523,669 | A * | 6/1985 | Smith | 198/313 |
| 4,946,027 | A * | 8/1990 | Jenkins | 198/592 |
| 5,642,803 | A * | 7/1997 | Tanaka | 198/535 |
| 5,788,461 | A * | 8/1998 | Easton et al. | 414/796.2 |
| 5,796,052 | A * | 8/1998 | Christmann | 177/145 |
| 5,902,089 | A | 5/1999 | Sinn et al. | |
| 6,431,346 | B1 | 8/2002 | Gilmore et al. | |
| 6,910,586 | B2 * | 6/2005 | McCloskey | 209/241 |
| 6,929,113 | B1 * | 8/2005 | Hoover et al. | 198/812 |
| 7,108,125 | B2 * | 9/2006 | Gilmore et al. | 198/812 |
| 7,347,418 | B2 * | 3/2008 | Speller | 271/264 |
| 7,404,556 | B2 * | 7/2008 | Allen et al. | 271/201 |
| 7,513,354 | B1 * | 4/2009 | Canapa | 198/312 |
| 7,753,357 | B2 * | 7/2010 | Allen et al. | 271/69 |
| 8,262,334 | B2 * | 9/2012 | Christensen et al. | 414/398 |
| 8,381,900 | B1 * | 2/2013 | Hoogestraat | 198/588 |

OTHER PUBLICATIONS

British Search Report dated Dec. 10, 2010 for British Application No. GB1017496.9.

* cited by examiner

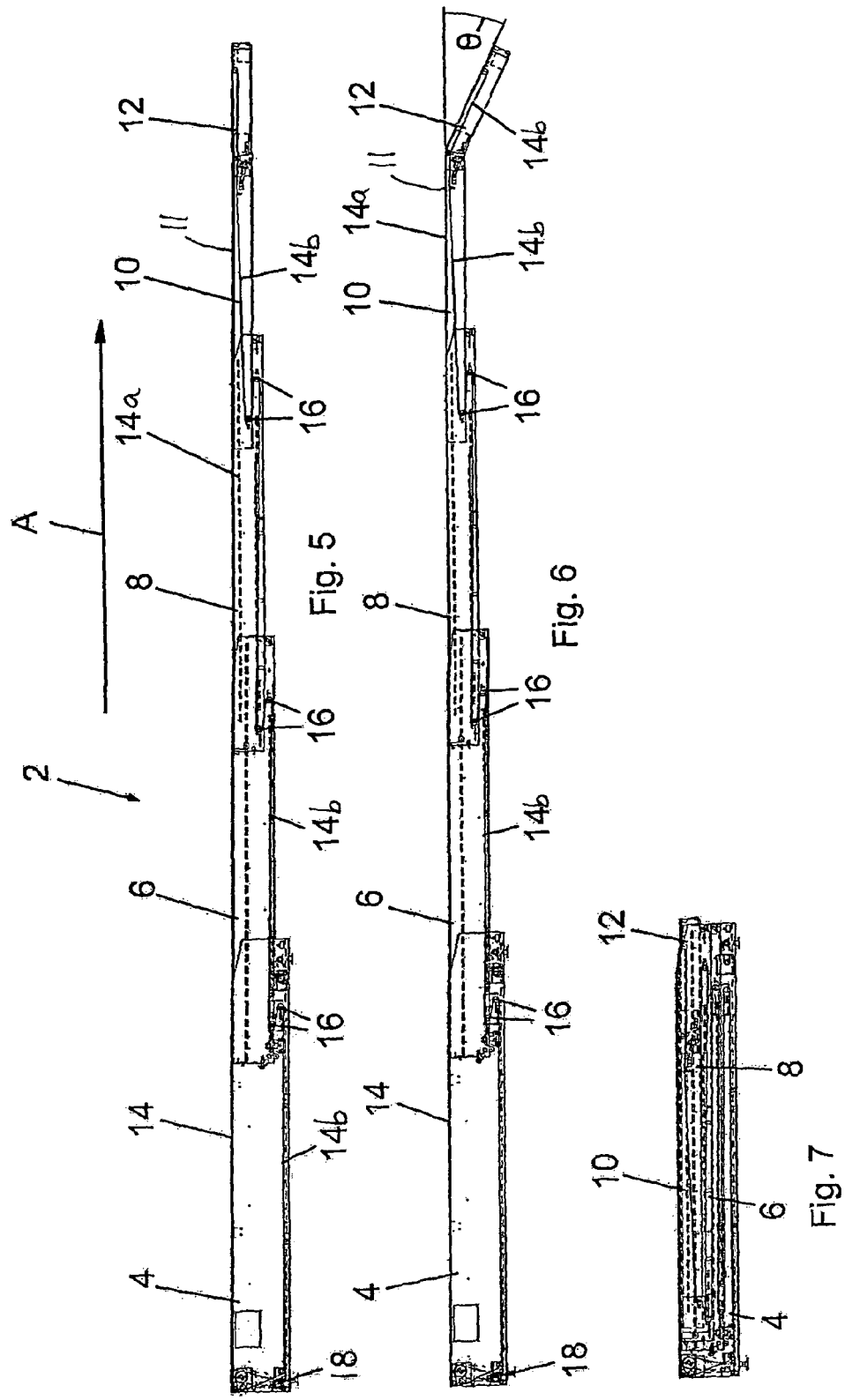

TELESCOPIC BELT CONVEYOR

The present invention relates to a telescopic belt conveyor for conveying goods.

Telescopic belt conveyors are widely used in warehouses and distribution centres for conveying goods to and from delivery vehicles. Typically, a telescopic belt conveyor includes a base conveyor unit, an extendable outer conveyor unit and optionally one or more intermediate conveyor units that are nested within one another when retracted and can be extended telescopically from the base conveyor unit. The base, outer and optional intermediate conveyor units support a conveyor belt that travels over the upper surfaces of the conveyor units to convey goods placed on the belt. The lower part of each conveyor unit includes a belt return mechanism that compensates automatically for changes in the length of the conveyor to maintain a substantially constant tension in the belt.

A telescopic belt conveyor is generally mounted in a loading dock of a warehouse and is designed so that, when extended, the free end of the conveyor is located at a height of about 200 cm above the exterior ground level. This is ideal when the delivery vehicle is a large lorry as it allows a worker in the vehicle comfortably to transfer goods between the conveyor and the vehicle.

However, a height of 200 cm may be too great for convenient use when the delivery vehicle is a smaller vehicle, such as a van. In this situation it may be difficult or dangerous for a worker in the vehicle to transfer goods between the conveyor and the vehicle.

A telescopic belt conveyor described in U.S. Pat. No. 5,351,809 includes an adjustable vertical support that allows the entire conveyor to be tilted upwards or downwards about a pivot axis at the rear of the base conveyor unit. This allows the conveyor to accommodate variations in the height of the delivery vehicles. However, to allow for downwards tilting, the base conveyor unit has to be supported in a raised position relative to the ground, which may be inconvenient for workers transferring goods to and from the conveyor in the warehouse. Also, only a relatively restricted range of vertical movement is possible, owing to the fact that the vertical adjustment mechanism causes the height of the conveyor to vary within the loading dock.

U.S. Pat. No. 6,431,346 describes another telescopic belt conveyor that can be tilted upwards or downwards as a whole to accommodate different vehicle heights. A user interface unit is mounted on an end of the extendable conveyor section and includes an adjustable boom that is pivotably mounted on a carriage assembly. Separate conveyor belts are provided for the extendable conveyor section and the adjustable boom of the user interface unit, and a set of rollers is provided to bridge the gap between the two belts. The user interface unit is mounted above the extendable conveyor section and can be retracted above the extendable conveyor section, but it is not retractable telescopically relative to the extendable conveyor section (that is, it is not nested within the next conveyor section). As a result, the height of the conveyor is increased.

It an object of the present invention to provide a telescopic belt conveyor that mitigates one or more of the aforesaid disadvantages.

According to the present invention there is provided a telescopic belt conveyor including a base conveyor unit, an outer conveyor unit and optionally one or more intermediate conveyor units, the outer conveyor unit and any intermediate conveyor units being mounted on the base conveyor unit and extendable telescopically therefrom in an extension direction, the outer conveyor unit including a pivotable outer conveyor section that is mounted for pivoting movement about a substantially horizontal pivot axis, and a conveyor belt supported by the base conveyor unit, the outer conveyor unit and any intermediate conveyor units, the conveyor belt providing a conveyor surface that extends continuously along an upper surface of the base conveyor unit, the outer conveyor unit and any intermediate conveyor units, said pivotable outer conveyor section having a free end remote from said pivot axis whose height relative to a ground surface may be adjusted by pivoting movement of the pivotable outer conveyor section.

The pivotable conveyor section can be adjusted to provide a variable loading height suited to the height of the vehicle to or from which goods are being transferred. No other modification to the telescopic belt conveyor is required and the height at which the telescopic belt conveyor extends through the loading dock is unaffected.

Advantageously, the outer conveyor unit is telescopically extendable from a retracted position in which the pivotable conveyor section is nested within an adjacent conveyor unit. This avoids any increase in the overall height of the conveyor.

The telescopic belt conveyor may include drive means for adjusting the pivot angle of the pivotable conveyor section.

Preferably, the pivotable conveyor section is pivotable downwards relative to the upper surface of the extendable outer conveyor unit through a pivot angle range of approximately 0-25°. Alternatively, the pivotable conveyor section may be arranged to pivot upwards and/or to pivot downwards by more than 25°.

The pivotable conveyor section preferably has a length in the range 1-3 meters, preferably 1.5-2 meters.

The pivot axis is preferably located adjacent the upper surface of the outer conveyor unit, to minimise any gap formed between the inner and outer conveyor sections as the pivotable outer conveyor section pivots.

Advantageously, the conveyor belt provides a conveyor surface that extends continuously along an upper surface of at least part of the pivotable conveyor section.

The conveyor belt thus extends in a continuous run without any breaks from the base conveyor unit to the pivotable conveyor section. This ensures the controlled movement of goods along the length of the belt conveyor.

The telescopic belt conveyor may include a belt support structure that supports the conveyor belt in the vicinity of the pivot axis. The belt support structure preferably includes a first element that supports a conveying section of the belt and a second element that supports a returning section of the belt. The first and second elements are preferably positioned so as to support the conveying and returning sections of the belt approximately equi-distantly above and below the pivot axis, so that the tension of the conveyor belt does not change significantly during pivoting of the pivotable conveyor section.

The pivotable conveyor section may have a free end and free running rollers adjacent the free end, allowing a worker in the vehicle to transfer goods easily to or from the conveyor.

The outer conveyor unit may include an inner conveyor section, wherein the pivotable conveyor section is mounted on a free end of the inner conveyor section.

The telescopic belt conveyor may include one or more extendable intermediate conveyor units between the base conveyor unit and the outer conveyor unit.

An embodiment of the invention will now be described by way of example with reference to the accompanying drawings, in which:

FIG. 5 is a sectional side view showing a complete telescopic belt conveyor in an extended configuration;

FIG. 6 is a sectional side view showing the telescopic belt conveyor with the pivotable conveyor section in a downwardly pivoted configuration;

FIG. 7 is a sectional side view showing the telescopic belt conveyor in a retracted configuration.

Figure 1:
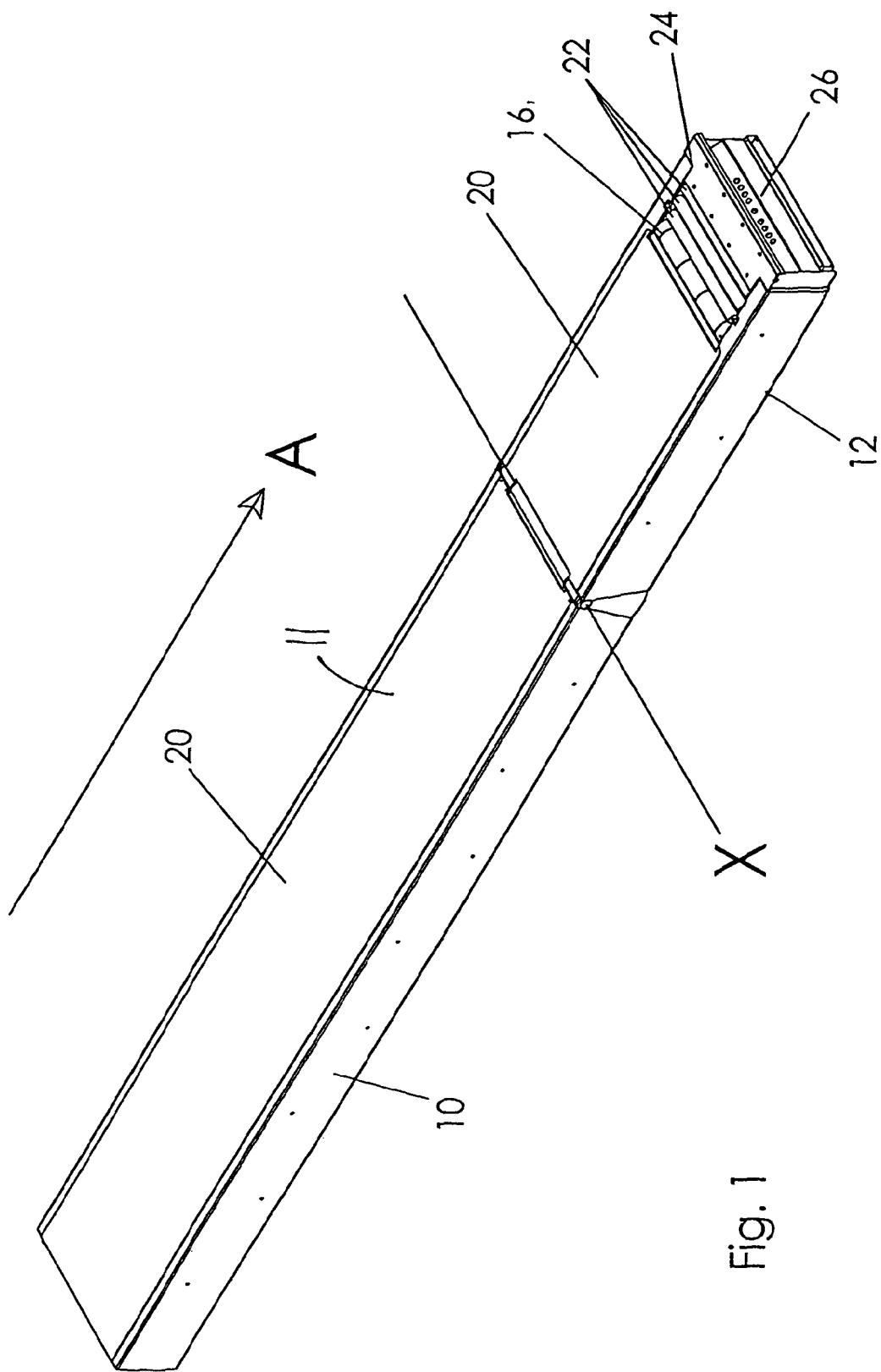
FIG. 1 is an isometric view of an outer conveyor unit of a telescopic belt conveyor, with the conveyor belt removed, the outer conveyor unit comprising an inner conveyor section and an outer pivotable conveyor section.
Figure 2:
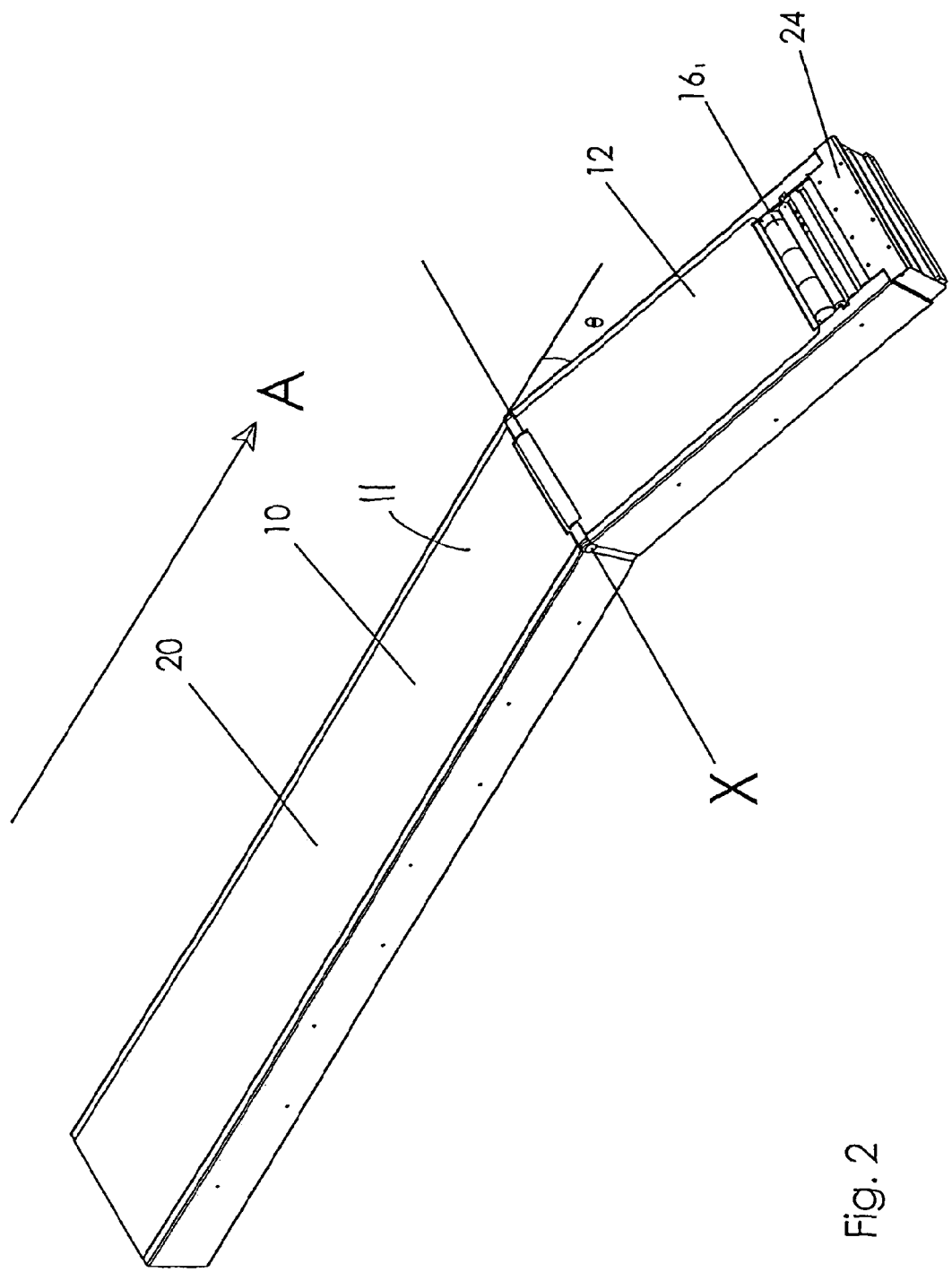
FIG. 2 is an isometric view of the outer conveyor unit, showing the pivotable conveyor section in a downwardly pivoted configuration.
Figure 3:
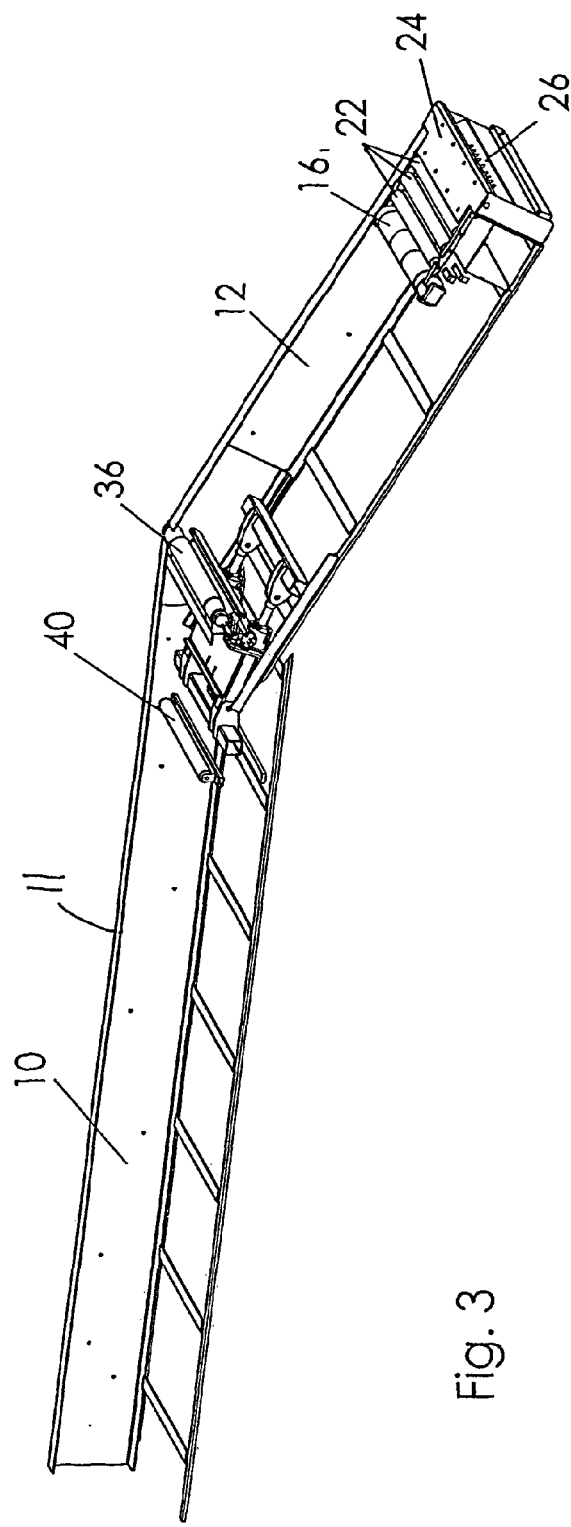
FIG. 3 is an isometric view of the outer conveyor unit, with part of the housing removed to show internal components of the inner and outer conveyor sections.

Referring first to FIGS. 5-7, in this example the telescopic belt conveyor 2 includes a base conveyor unit 4, first and second intermediate conveyor units 6, 8 and an outer conveyor unit 10. The outer conveyor unit 10 includes an inner conveyor section 11 and an outer pivotable conveyor section 12 that is pivotably mounted on a free end of the inner conveyor section 11.

The intermediate conveyor units 6, 8 and the outer conveyor unit 10 are telescopically mounted in relation to one another and the base conveyor unit 4 so that they can be extended outwards from the base conveyor unit in an extension direction A, as shown in FIGS. 5 and 6. In this extended configuration the intermediate conveyor units 6, 8 and the outer conveyor unit 10 are supported by the base conveyor unit 4 as cantilevers.

The intermediate and outer conveyor units 6, 8, 10 can also be retracted telescopically as shown in FIG. 7 so that in the retracted configuration the intermediate and outer conveyor units 6, 8, 10 overlie the base conveyor unit 4, each conveyor unit being nested within the next adjacent inner conveyor unit. The inner conveyor section 11 and the pivotable conveyor section 12 of the outer conveyor unit 10 therefore overlie and are accommodated within the base conveyor unit 4 and the intermediate conveyor units 6, 8 when the conveyor is retracted, the total length of the inner and outer conveyor sections 11, 12 being slightly less than the length of the base conveyor unit 4.

The intermediate conveyor units 6, 8 and the outer conveyor unit 10 are supported by a support mechanism that allows the conveyor units to be extended and retracted telescopically as required relative to the base conveyor unit 4. Any suitable telescopic support mechanism may be used. The support mechanism may for example include sets of wheels that run on tracks in the adjacent conveyor units, as described in U.S. Pat. No. 3,835,980 (Brooks, Jnr), the disclosure of which is incorporated herein by reference. The telescopic support mechanism allows the intermediate conveyor units 6, 8 and the outer conveyor unit 10 to be accommodated within the height and width of the base conveyor unit 4 when retracted.

A drive mechanism (not shown) is provided for extending and retracting the telescopic belt conveyor. Again, any suitable drive mechanism may be used. For example, the drive mechanism may consist of a set of drive chains driven by sprockets, as described in U.S. Pat. No. 3,835,980 (Brooks, Jnr).

A conveyor belt 14 is supported by the base, intermediate, outer conveyor units 4, 6, 8, 10 for conveying goods along the conveyor. The conveyor belt 14 comprises a continuous loop and includes a conveying section 14a that is supported by the upper surfaces of the conveyor units 4, 6, 8, 10 and a returning section 14b that passes in the reverse direction through the lower parts of the conveyor units. The conveyor belt 14 passes around numerous guide rollers 16 that guide the belt and maintain it at a substantially constant tension as the telescopic belt conveyor extends and retracts. Any suitable belt guide mechanism may be used. For example, the belt guide mechanism may be substantially as described in U.S. Pat. No. 3,835, 980 (Brooks, Jnr). A reversible drive guide motor 18 is provided for driving the conveyor belt 14 forwards or backwards, for conveying goods to or from a delivery vehicle.

The inner conveyor section 11 and the pivotable conveyor section 12 of the outer conveyor unit 10 are shown in more detail in FIGS. 1-4. The inner conveyor section 11 and the pivotable conveyor section 12 each include an upper support surface 20 that supports the conveying section of the conveyor belt 14 (the base conveyor unit 4 and the intermediate conveyor units 6, 8 also include support surfaces that support the conveying section of the conveyor belt). The conveyor belt 14 has been omitted from each of FIGS. 1-4 allowing the underlying parts of the inner and pivotable conveyor sections 11, 12 to be seen.

The pivotable conveyor section 12 includes a guide roller $16_1$ for the conveyor belt, which is located a short distance from the free end of the pivotable conveyor section 12. The belt passes around this roller $16_1$, which defines the maximum outward extent of the conveyor belt. A number of free running rollers 22 and a slide plate 24 are provided between the guide roller $16_1$ and the free end of the pivotable conveyor section 12, which allow a worker to transfer goods easily to and from the conveyor belt. A control panel 26 for controlling operation of the telescopic belt conveyor is provided on the free end of the pivotable conveyor section 12.

The pivotable conveyor section 12 is connected to the outer (or distal) end of the inner conveyor section 11 by means of a pivot joint 28. The pivot axis X of the pivot joint 28 is substantially horizontal and perpendicular to the extension direction A, and is located adjacent to but slightly below the upper support surfaces 20 of the inner and pivotable conveyor sections 11, 12. The pivotable conveyor section 12 is able to pivot about this pivot axis X between a horizontal position shown in FIG. 1 and a downwardly tilted position shown in FIG. 2. The pivot angle θ measured downwards relative to horizontal, is typically adjustable in the range 0-25°. However, it is alternatively possible to arrange for the pivotable conveyor section 12 to pivot upwards and/or to pivot downwards by more than 25°.

Figure 4:
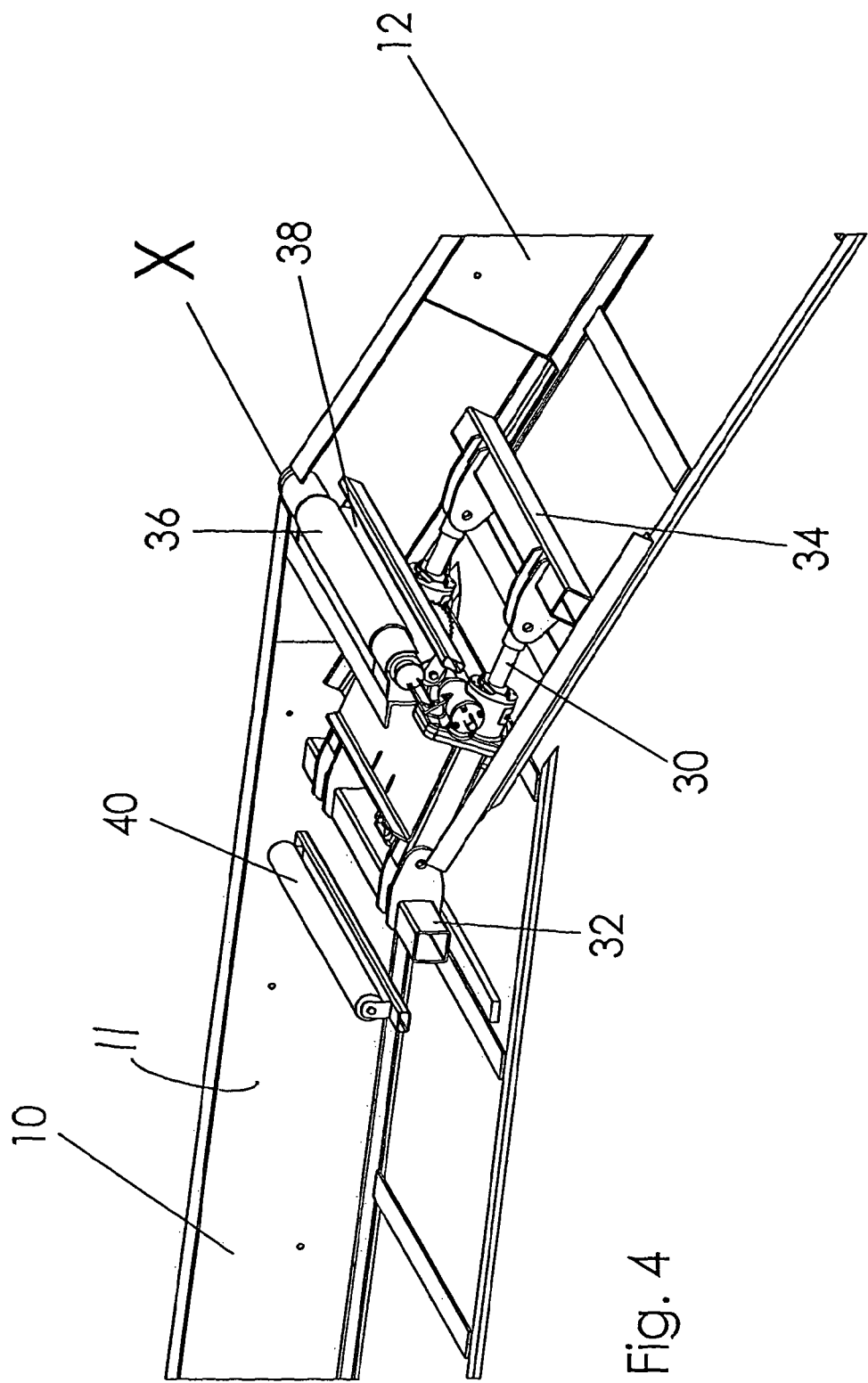
FIG. 4 is an enlarged view showing part of the mechanism illustrated in FIG. 3.

The pivot drive mechanism for adjusting the pivot angle θ is shown in more detail in FIG. 4. The drive mechanism includes a linked pair of motor-driven rams 30 that act between a first transverse beam 32 in the lower part of the inner conveyor section 11 and a second transverse beam 34 in the lower part of the pivotable conveyor section 12. As the rams 30 extend and contract they cause the pivotable conveyor section 12 to pivot about the pivot axis X. It will be appreciated that the motor-driven rams may be replaced by alternative drive means if required.

The pivot mechanism also includes a belt support structure for supporting and guiding the conveyor belt 14 as it passes around the pivot joint. This belt support structure includes a first guide roller 36 that is mounted concentrically with the pivot axis X, a second guide roller 38 mounted within the pivotable conveyor section 12 just below the first guide roller 36, and a third guide roller 40 mounted within the inner conveyor section 11. The first guide roller 36 engages and supports the underside of the conveying section of the conveyor belt 14 as it passes over the support surfaces 20 of the inner and pivotable conveyor sections 11, 12. The second and third guide rollers engage and support the returning section of the belt that passes through the lower parts of the inner and outer conveyor sections 11, 12. These three guide rollers 36,38,40 ensure that the conveying and returning sections of the belt pass approximately equi-distantly above and below the pivot axis X, so that the tension of the belt is substantially unaffected by the pivoting movement of the pivotable conveyor section 12.

Figure 8:
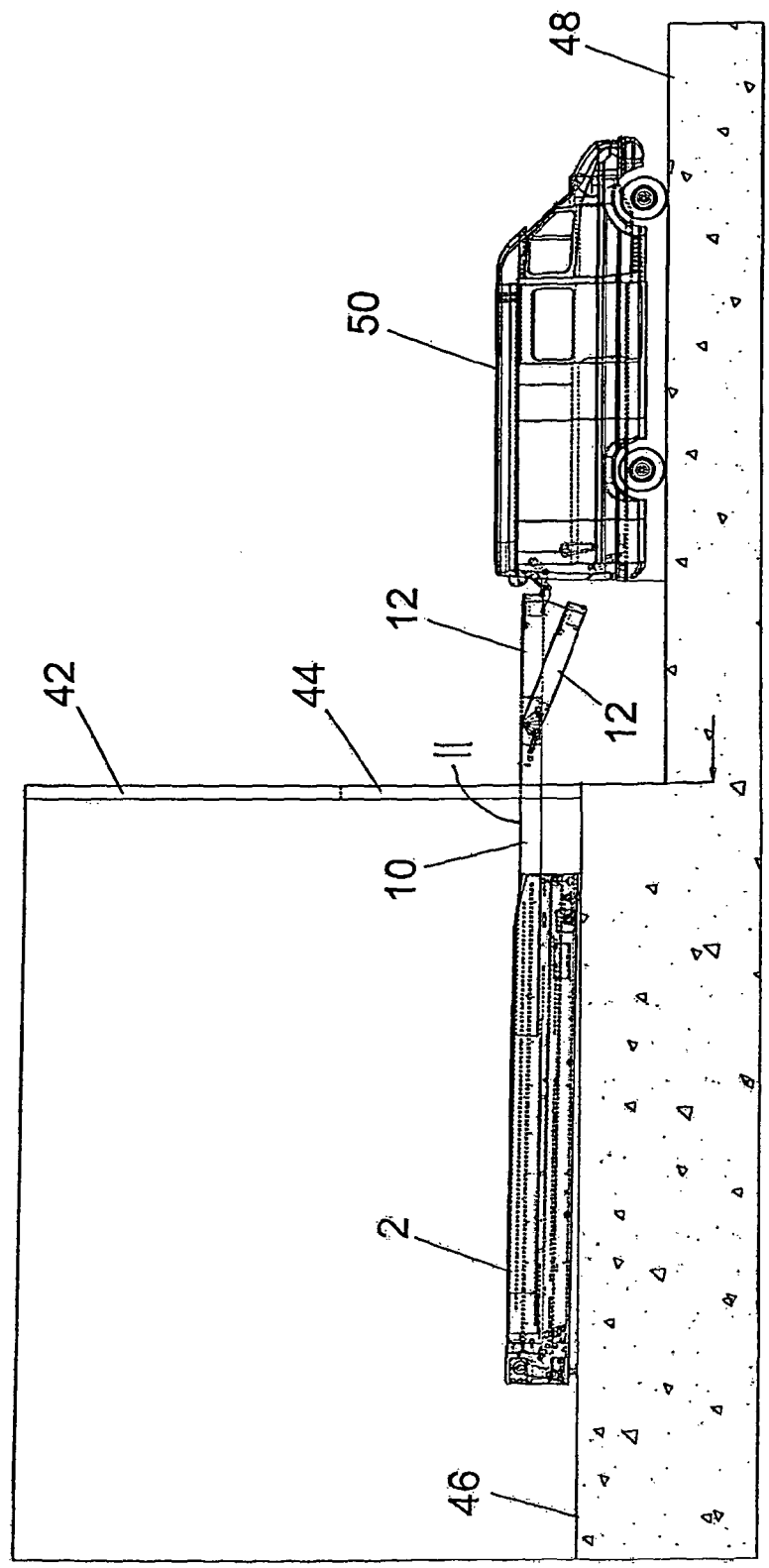
FIG. 8 is a sectional side view showing the telescopic belt conveyor mounted in a loading dock, wherein the conveyor is shown in retracted, extended and extended/pivoted configurations, together with a delivery vehicle.

Use of the telescopic belt conveyor is illustrated in FIG. 8. In this example, the telescopic belt conveyor 2 is located in a warehouse 42 adjacent a loading dock 44. The interior floor level 46 within the warehouse 42 is usually higher than the external ground surface 48, typically by about 120 cm. This allows a delivery vehicle 50 to reverse up to the loading dock 44 to load or unload goods. Alternatively, the conveyor 2 may be supported on stands above floor level, for example where the floor level in the warehouse is lower.

The telescopic belt conveyor 2 is usually mounted so that the upper support surfaces 20 of the base, intermediate and outer conveyor units 4, 6, 8, 10 are at a height of about 200 cm above the exterior ground level 48, this being an ideal delivery height for lorries and other large delivery vehicles, where the floor of the goods compartment is typically at a height of about 120-125 cm above ground level.

For smaller delivery vehicles such as the van 50 illustrated in FIG. 8, the floor of the goods compartment is usually much lower, for example typically at a height of about 58 cm. A delivery height of 200 cm would be too great in such a situation. However, by pivoting the pivotable conveyor section 12 downwards the delivery height can be reduced. For example, in this example, the pivotable outer conveyor section 12 has a length of 180 cm and can be pivoted downwards by a pivot angle of 25°, which reduces the delivery height by 76 cm to about 124 cm above ground level. This makes the task of loading and unloading the vehicle easier and safer.

The invention claimed is:

1. A telescopic belt conveyor including a base conveyor unit, an outer conveyor unit and one or more intermediate conveyor units, the outer conveyor unit and the one or more intermediate conveyor units being mounted on the base conveyor unit and extendable telescopically therefrom in an extension direction, the outer conveyor unit including a pivotable conveyor section that is mounted for pivoting movement about a substantially horizontal pivot axis, and a conveyor belt supported by the base conveyor unit, the outer conveyor unit and the one or more intermediate conveyor units, the conveyor belt providing a conveyor surface that extends continuously along an upper surface of the base conveyor unit, the outer conveyor unit and the one or more intermediate conveyor units, said pivotable conveyor section having a free end remote from said pivot axis whose height relative to a ground surface may be adjusted by pivoting movement of the pivotable conveyor section, wherein the outer conveyor unit is telescopically extendable from a retracted position in which the pivotable conveyor section is nested within an adjacent conveyor unit.

2. A telescopic belt conveyor according to claim 1, including drive means for adjusting a pivot angle of the pivotable conveyor section.

3. A telescopic belt conveyor according to claim 1, in which the pivotable conveyor section is pivotable downwards relative to the upper surface of the extendable outer conveyor unit through a pivot angle range of approximately 0-25°.

4. A telescopic belt conveyor according to claim 1, in which the pivotable conveyor section has a length in the range of 1-3 meters.

5. A telescopic belt conveyor according to claim 1, in which the pivot axis is located adjacent the upper surface of the outer conveyor unit.

6. A telescopic belt conveyor according to claim 1, in which the conveyor belt provides a conveyor surface that extends continuously along an upper surface of at least part of the pivotable conveyor section.

7. A telescopic belt conveyor according to claim 6, including a belt support structure that supports the conveyor belt in the vicinity of the pivot axis.

8. A telescopic belt conveyor according to claim 7, in which the belt support structure includes a first element that supports a conveying section of the belt and a second element that supports a returning section of the belt.

9. A telescopic belt conveyor according to claim 8 in which the first and second elements are positioned so as to support the conveying and returning sections of the belt approximately equi-distantly above and below the pivot axis.

10. A telescopic belt conveyor according to claim 1, in which the pivotable conveyor section has a free end and free running rollers adjacent the free end.

11. A telescopic belt conveyor according to claim 1, in which the outer conveyor unit includes an inner conveyor section and the pivotable conveyor section is mounted to a free end of the inner conveyor section, the conveyor belt providing a conveyor surface that extends continuously along an upper surface of the inner conveyor section and the pivotable conveyor section.

12. A telescopic belt conveyor according to claim 1, including one or more telescopically extending intermediate conveyor units between the base conveyor unit and the outer conveyor unit.

* * * * *